(12) United States Patent
Eastman

(10) Patent No.: US 9,505,299 B1
(45) Date of Patent: Nov. 29, 2016

(54) FLUID EVACUATION SYSTEM FOR DRIVE CHAMBER

(71) Applicant: Deere & Company, Moline, IL (US)

(72) Inventor: Briton T. Eastman, Coffeyville, KS (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 14/877,747

(22) Filed: Oct. 7, 2015

(51) Int. Cl.
*B60K 7/00* (2006.01)
*B60R 16/08* (2006.01)
*A01M 7/00* (2006.01)
*A01C 23/00* (2006.01)
*B60K 17/04* (2006.01)

(52) U.S. Cl.
CPC .............. *B60K 7/0007* (2013.01); *B60R 16/08* (2013.01); *A01C 23/008* (2013.01); *A01M 7/0082* (2013.01); *B60K 17/046* (2013.01); *B60K 2007/0038* (2013.01); *B60K 2007/0092* (2013.01); *B60Y 2200/224* (2013.01); *B60Y 2410/10* (2013.01); *B60Y 2410/102* (2013.01)

(58) Field of Classification Search
CPC .............. B60K 7/0007; B60K 7/0038; B60K 2007/0092; B60K 11/02; B60K 2001/003; B60K 2001/006; B60Y 2410/10; B60Y 2410/102; H02K 5/12; H02K 5/128; H02K 5/1285; H02K 5/05; H02K 5/20; H02K 2005/1287
See application file for complete search history.

(56) References Cited

U.S. PATENT DOCUMENTS

| | | | | |
|---|---|---|---|---|
| 3,223,043 A * | 12/1965 | Shapiro | ............... | H02K 5/1282 310/268 |
| 3,770,074 A * | 11/1973 | Sherman | ............... | B60K 7/0007 180/339 |
| 3,812,928 A * | 5/1974 | Rockwell | ............. | B60K 7/0007 105/55 |
| 4,326,450 A * | 4/1982 | Bacquie | ............... | B60K 7/0015 91/487 |
| 5,340,273 A * | 8/1994 | Rockwood | ............ | F04D 29/061 184/11.2 |
| 5,627,420 A * | 5/1997 | Rinker | ................. | F04D 29/628 310/54 |
| 5,858,070 A | 1/1999 | Halm et al. | | |
| 7,508,100 B2 * | 3/2009 | Foster | ...................... | B60K 6/26 180/65.6 |
| 7,622,836 B2 * | 11/2009 | DeVeny | ............... | B60K 7/0007 180/65.51 |
| 7,633,193 B2 * | 12/2009 | Masoudipour | ........... | H02K 9/19 310/54 |
| 8,432,074 B2 | 4/2013 | Creviston | | |
| 8,536,743 B2 * | 9/2013 | Kasuya | ..................... | B60K 6/48 310/52 |
| 9,080,293 B2 * | 7/2015 | Graner | ................... | E01C 23/088 |
| 9,387,722 B2 * | 7/2016 | Fukudome | ......... | F16C 33/6685 |
| 2007/0065317 A1 * | 3/2007 | Stock | ...................... | F04D 25/06 417/423.11 |

* cited by examiner

*Primary Examiner* — Erez Gurari

(74) *Attorney, Agent, or Firm* — Lorenz & Kopf, LLP

(57) ABSTRACT

A drive arrangement includes a housing having two chambers and a partition defining an annular space within the housing. A disk is mounted on a shaft of the drive arrangement and includes an annular portion disposed within the annular space. A face of the annular portion is axially spaced from the partition by a gap clearance. An axial dimension of the gap clearance is such that rotation of the disk generates a negative pressure gradient for drawing fluid from the first chamber through the gap clearance in a radial direction toward the rotation axis. The fluid then moves along the face of the disk in a radial direction away from the rotation axis under centrifugal action of the rotating disk. The outer periphery of the disk is spaced from the housing to permit fluid to pass, by centrifugal action, from the outer periphery toward a second chamber.

20 Claims, 4 Drawing Sheets

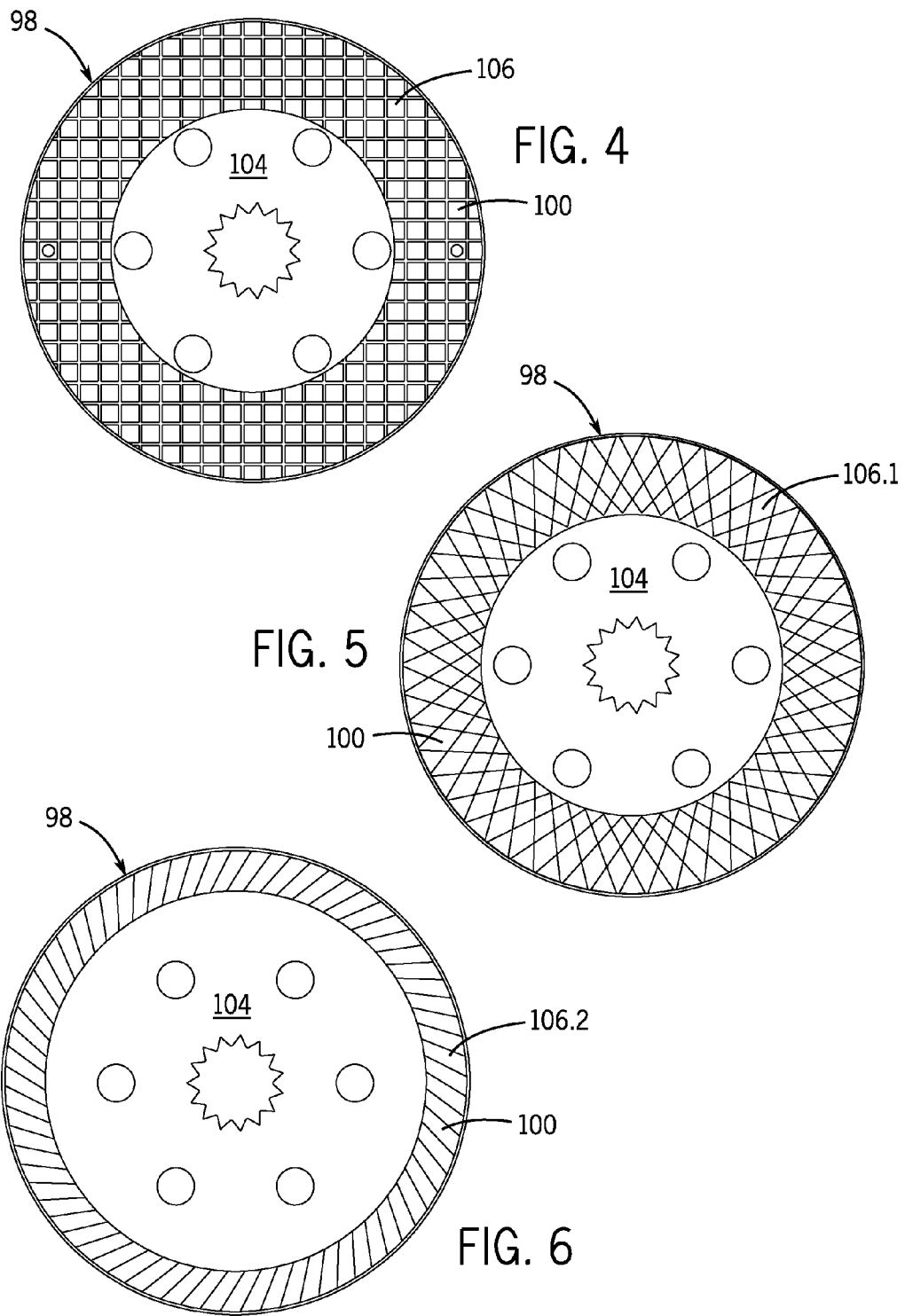

FLUID EVACUATION SYSTEM FOR DRIVE CHAMBER

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a rotating fluid transport arrangement, which may be used in various assemblies (e.g., power transfer drives) to transport fluid from one area to another.

BACKGROUND OF THE DISCLOSURE

Various work vehicles are driven (e.g., by rotation of ground engaging wheels or tracks) using various drive arrangements (e.g., drive axles, final drives, etc.) that include driven components (e.g., brakes, clutches, gears and so on). Liquid lubricating and cooling fluid may be delivered to these components, or these components may be submerged in fluid. The drive arrangements may also include drive components (e.g., electric motors or hydraulic motors) mounted within the same housing as the driven components. The close proximity of the motor and gears, for example, may lead to fluid pooling or otherwise migrating from the driven components into the chamber housing the drive component. In the case of an electric motor, accumulation of fluid into the small gap between the rotor and stator may cause power inefficiencies resulting from the drag induced by the presence of the fluid, especially when the housing and fluid are pressurized.

SUMMARY OF THE DISCLOSURE

This disclosure provides a system for evacuating liquid such as a lubricating and cooling fluid from an internal chamber, such as a drive motor chamber, using a rotating member spinning in a controlled gap clearance to carry liquid away from the drive motor chamber.

In one aspect the disclosure provides a drive arrangement having a housing with first and second chambers. A shaft may be mounted within the housing for rotation about a rotation axis extending between the first and second chambers. A partition within the housing between the first and second chambers may allow fluid communication there between. A disk mounted to the shaft for co-rotation about the rotation axis may have an outer periphery and an annular portion with a face having entraining surface features to stimulate fluid transport of the rotating disk. The face of the disk is spaced apart from the partition by a gap clearance. The gap clearance may have an axial dimension (in an axial direction of the drive arrangement) selected such that rotation of the disk creates a negative pressure gradient, which draws fluid from the first chamber into the second chamber. Initially fluid may be drawn in the axial direction from the first chamber through a passage into the gap clearance. From there fluid is drawn in a radially inward direction toward the rotation axis until the centrifugal action of the rotating disk thereafter moves the fluid along the face of the disk in a radially outward direction away from the rotation axis. The outer periphery of the disk may be spaced from the housing to permit fluid to pass, by centrifugal action, from the outer periphery of the disk into the second chamber.

In another aspect the disclosure provides a drive arrangement having housing with first and second chambers. A shaft may be mounted within the housing for rotation about a rotation axis extending between the first and second chambers. An annular wall fixed within the housing and positioned axially with respect to the rotation axis between the first and second chambers may allow fluid communication between the first and second chambers. The annular wall may have an inner diameter between the first and second chambers radially inward of a passage extending between the first and second chambers. A disk mounted to the shaft for co-rotation about the rotation axis may have an outer periphery and an annular portion having a face with entraining surface features for stimulating fluid transport of the rotating disk. The face of the disk may be spaced along the rotation axis from the annular wall by a gap clearance. The gap clearance may have an axial dimension selected such that rotation of the disk creates a pressure gradient drawing fluid from a direction of the first chamber through the gap clearance in a radial direction toward the rotation axis to an inner diameter of the annular portion of the disk. Rotation of the disk thereafter may move the fluid, under centrifugal action, along the face of the disk in a radial direction away from the rotation axis. The outer periphery of the disk may be spaced from the housing to permit fluid to pass, by centrifugal action, from the outer periphery of the disk toward the second chamber.

In yet another aspect the disclosure provides a drive arrangement having a housing having a motor casing and a gear train casing. A motor is contained in a motor chamber of the motor casing and a gear train contained in a gear chamber of the gear train casing. The motor may have a shaft rotatable about a rotation axis. A partition within the housing between the motor casing and gear train casing may allow fluid communication between the motor and gear chambers. A disk mounted to the shaft for co-rotation about the rotation axis may have an outer periphery and an annular portion having a face with entraining surface features for stimulating fluid transport of the rotating disk. The face of the disk may be spaced along the rotation axis from the partition by a gap clearance. The gap clearance may have an axial dimension selected such that rotation of the disk creates a pressure gradient drawing fluid from a direction of the motor chamber through the gap clearance in a radial direction toward the rotation axis to an inner diameter of the annular portion of the disk. Rotation of the disk thereafter may move the fluid, under centrifugal action, along the face of the disk in a radial direction away from the rotation axis. The outer periphery of the disk may be spaced from the housing to permit fluid to pass, by centrifugal action, from the outer periphery of the disk toward the gear chamber.

The details of one or more embodiments are set forth in the accompanying drawings and the description below. Other features and advantages will become apparent from the description, the drawings, and the claims.

BRIEF DESCRIPTION OF THE DRAWINGS

FIGS. 4-6 are plan views of example disk configurations for use in the example drive arrangements, showing example annular friction areas having waffle, sunburst and spiral patterns, respectively.

Like reference symbols in the various drawings indicate like elements.

DETAILED DESCRIPTION

Figure 1:
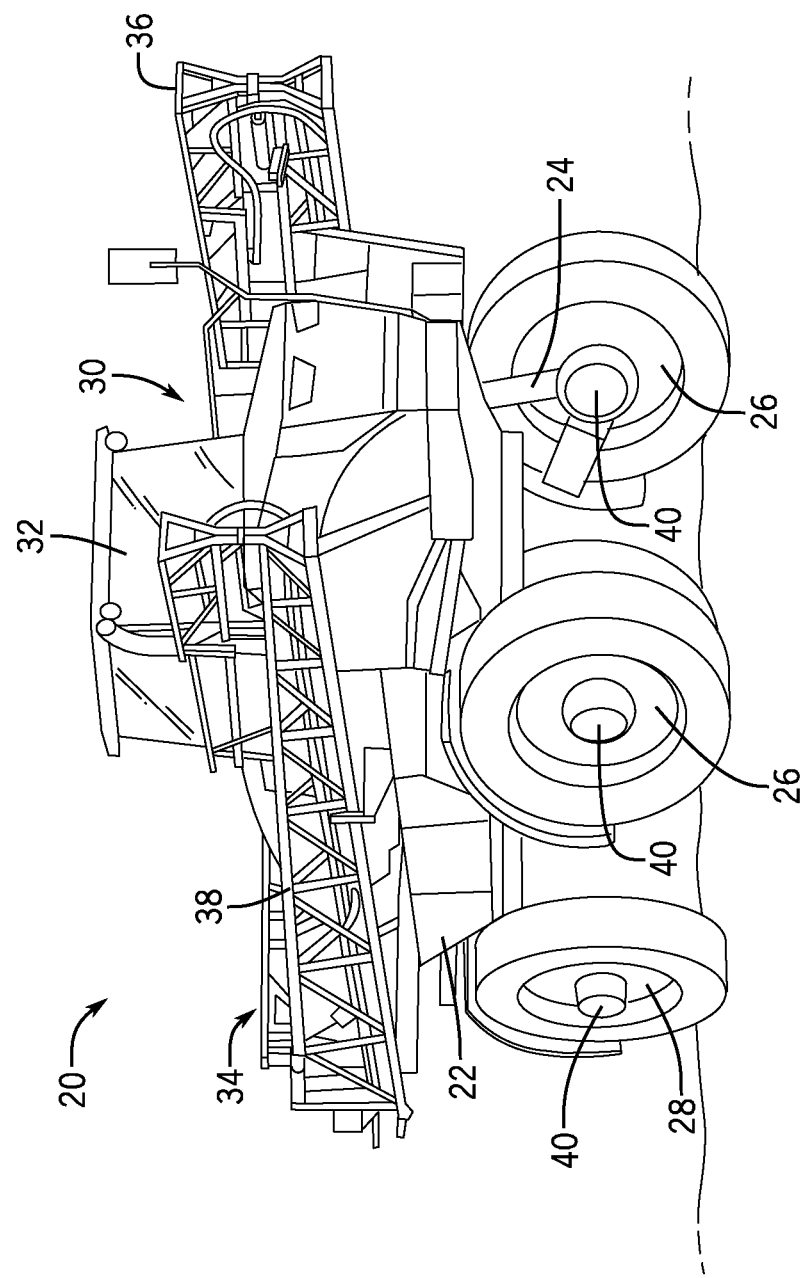
FIG. 1 is a perspective view of an example work vehicle in the form of a self-propelled agricultural sprayer having an example drive arrangement according to this disclosure.

The following describes one or more example embodiments of a drive arrangement having a fluid transport arrangement with a rotating disk, as shown in the accompanying figures of the drawings described briefly above. Various modifications to the example embodiments may be contemplated by one of skill in the art.

In-line or axial drive arrangements may be used for propelling various agricultural and off-road vehicles. Such drive arrangements may include a motor assembly and a gear train assembly to provide gear reduction and increased torque. Design requirements may mandate that the space envelope for the drive arrangement be minimized resulting in components being closely configured, oftentimes within an integral casing or common housing. It may also be necessary to cool and lubricate the components of the drive arrangement with a liquid lubricating fluid. However, in systems having an electric motor assembly it is desirable to limit the amount of lubricating fluid in the motor casing, and thereby reduce windage and parasitic drag caused when the fluid is present in the annular gap between the rotor and the stator of the electric motor.

Conventional drives may have used air pressure within the motor chamber for displacing the lubricating fluid. This approach has known disadvantages including aeration of the lubricating fluid, increased costs associated with compressing and routing the air through the motor assembly, cold performance issues and introduction of dirt and water from the compressed air into the drive assembly.

The drive arrangement proposed in this disclosure includes a simple mechanical fluid transport mechanism in the form of a rotating disk, which may be readily packaged on the drive shaft between the motor assembly and the gear train assembly. An annular portion of the rotating disk may be proximate to a partition in the housing by a controlled gap distance and configured to produce a negative pressure gradient, which draws lubricating fluid out from the motor casing towards the gear train casing. The rotating disk may be a clutch plate or friction brake element with a splined shaft positioned on the drive shaft of the motor assembly. A loose clearance may be provided between the disk and the housing to minimize windage and optimize lubricating fluid transport.

In certain embodiments, the disclosed drive arrangement, and in particular the location of the rotating disk and the partition, define various passageways from the motor chamber to gear train chamber. As such, a single partition or multiple partitions may be provided in the drive arrangement housing. Similarly, a single disk or multiple disks may be provided, each having single-sided or double-sided fluid transport surface. Likewise, the configuration of the rotating disk may include certain features of the fluid transport surface(s) are formed on the face of the annular portion that may be improve the adhesion to, or carrying volume of, the disk, the negative pressure gradient, and/or the centrifugal force by entraining the lubricating fluid on the disk. Thus, the rotation disk provides a low cost and robust method of moving lubricating fluid from the motor assembly to other components of the drive arrangement.

With reference now to the drawings, example drive arrangements will be described in the context of a work vehicle in the form of a self-propelled agricultural sprayer in which the drive arrangement rotates a wheel assembly having a single wheel. While such a motorized sprayer is illustrated as an example work vehicle herein, one skilled in the art will recognize that the configuration of the drive arrangement disclosed herein may be readily adapted for use on other types work vehicles and/or wheel assemblies having multiple wheels (e.g., two wheels) for a given drive arrangement. As such, the present disclosure should not be limited to applications associated with drive arrangements for single wheel assemblies or self-propelled agricultural sprayers.

Referring now to FIG. 1, a high clearance, self-propelled agricultural sprayer 20 is shown having a main frame 22 supported for forward movement over the ground by a suspension 24 having a pair of front wheel assemblies 26 and a pair of rear wheel assemblies 28. A body structure 30 includes a cab 32 supported on the frame 22 between the wheel assemblies 26, 28 and ahead of a stowable spraying assembly 34. The spraying assembly 34 includes a pair of articulated spray booms 36, 38 positionable from a stowed configuration such that each boom 36, 38 is folded and extends generally parallel to the main frame 12 as shown in FIG. 1 to a use position (not shown) such that each boom 36, 38 is unfolded and extends generally perpendicular to the main frame 12. A drive arrangement 40 coupled to each of the wheel assemblies 26, 28 is operable to rotate the wheel assemblies 26, 28 for propelling the sprayer 12. The drive arrangement 40 will be further described herein with reference to a front wheel assembly 26; however, one skilled in the art will appreciate that the rear wheel assembly 28 may also be powered by a drive arrangement 40 in a like manner.

Figure 2:
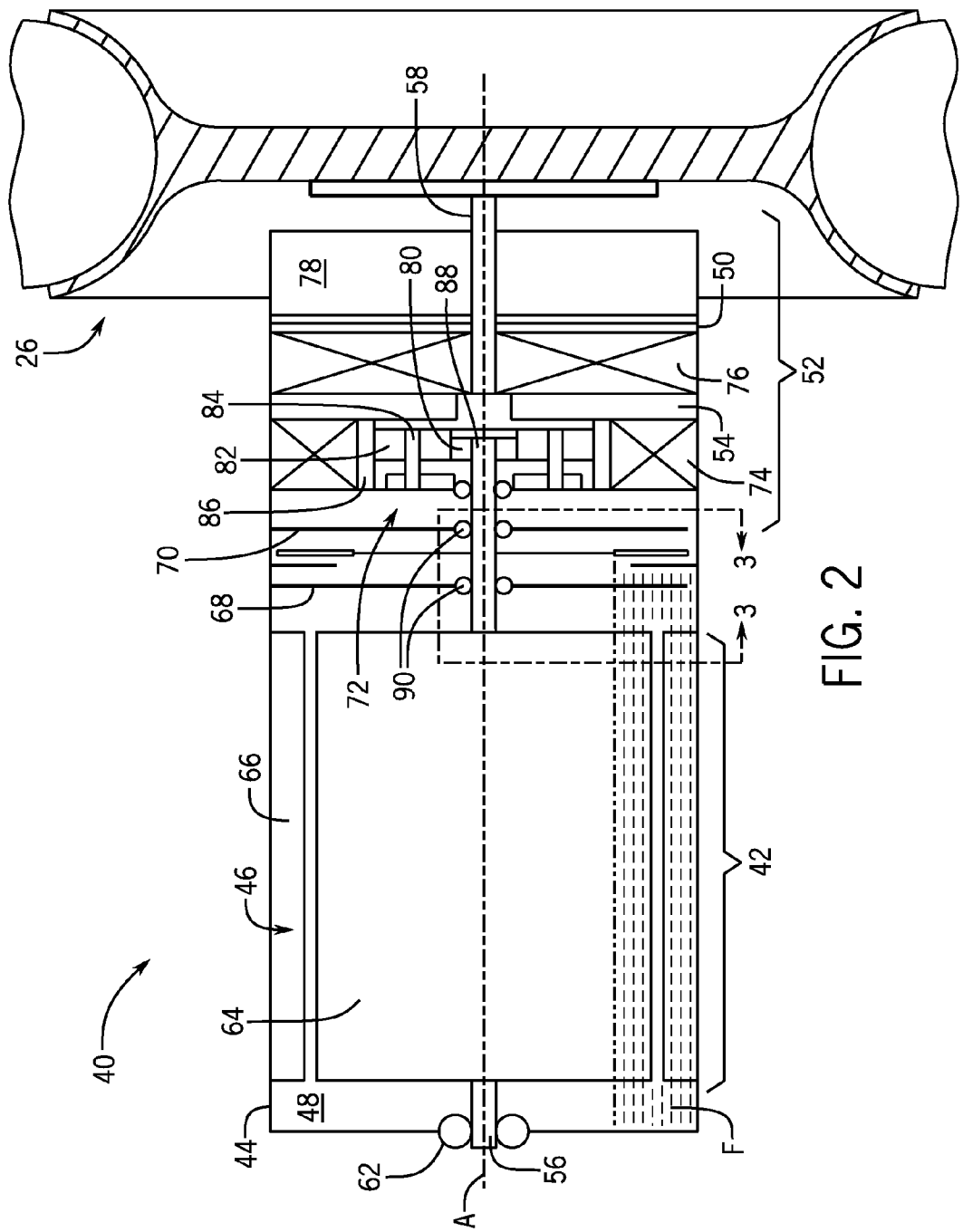
FIG. 2 is a schematic cross-sectional view of the example drive arrangement of FIG. 1.

With reference to FIG. 2, the drive arrangement 40 may include a motor assembly 42 having a motor casing 44 housing an electric motor 46 in a motor chamber 48 and a gear train casing 50 housing a gear train assembly 52 in a gear train chamber 54. A drive shaft 56 of the motor assembly 42 is rotatably coupled to the gear train assembly 52. An output shaft 58 from the gear train assembly 52 is coupled to a wheel hub 60 associated with the wheel assembly 26. A torque generated by the electric motor 46 is transmitted through the gear train assembly 52, which provides gear reduction and torque amplification, is delivered to the wheel assembly 26 for propelling the sprayer 20. In this way, the drive arrangement 40 may be referred to as an in-line or coaxial drive arrangement in which the motor assembly 42 and the drivetrain or gear train assembly 52 are aligned on a common axis, and the drive shaft 56 and the output shaft 58 would have a common axis of rotation A.

The drive shaft 56 may be supported in the motor casing 44 on bearings 62 for rotation about the axis of rotation A. By way of example, the electric motor 46 may include a rotor 64 formed on the drive shaft 56 and a stator 66 fixed in the motor casing 44. The drive shaft 56 extends through a first partition defined by an end wall 68 of the motor casing 44 and a second partition defined by an end wall 70 of the gear train casing 50.

As illustrated in FIG. 2, by way of example, the gear train assembly 52 may include a first planetary gear set 72, a clutch mechanism 74, a brake mechanism 76 and a second gear set 78. The first planetary gear set 72 may include a sun gear 80 fixed for rotation on the drive shaft 56, a set of planetary gears 82 rotatably supported on a carrier plate 84 and engaging the sun gear 80, and a ring gear 86 rotatably supported on the drive shaft 56 and engaging the planetary gears 82. The clutch mechanism 74, situated between the ring gear 86 and the gear train casing 50, selectively couples the ring gear 86 and the gear train casing 50.

An intermediate shaft 88 may extend from the carrier plate 84 to rotatably couple the first gear set 72 with an input side of the second gear set 78. The braking mechanism 76, situated between the intermediate shaft 88 and the gear train casing 50, may provide frictional braking between the first and second gear sets 72, 78. An output side of the second gear set 78 is rotatably coupled to the output shaft 58. While the second gear set 78 may include a planetary gear set (not shown), one skilled in the art will recognize that alternate or additional gear assemblies may be used to achieve the desired torque and speed characteristics of the drive arrangement 40. A set of bearings 90 may rotatably support the drive shaft 56 on the motor casing 44.

Figure 3:
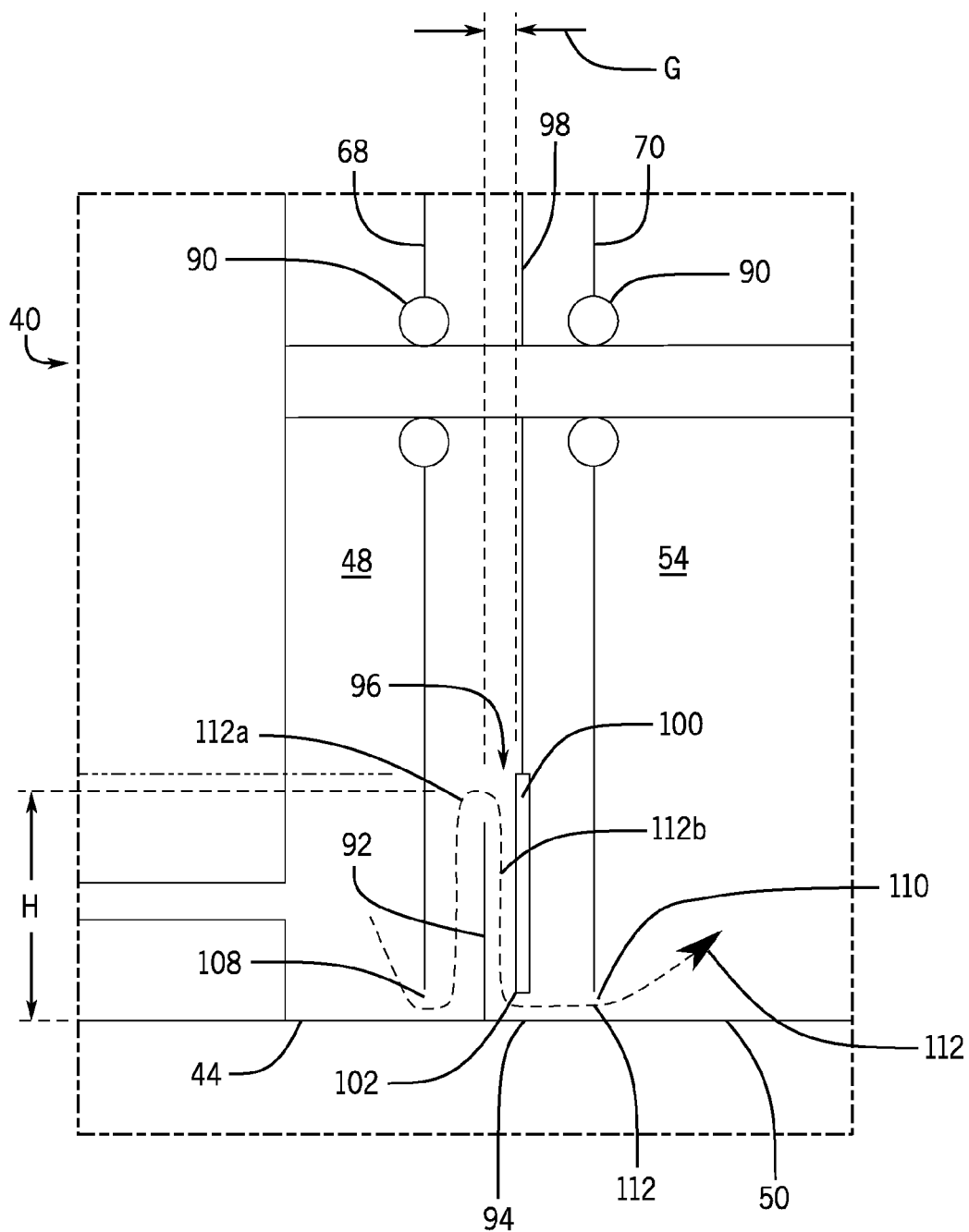
FIG. 3 is a simplified partial view of the schematic shown in FIG. 2.

With particular reference to FIGS. 2 and 3, an annular wall 92 may extend radially inward from a sidewall 94 of the motor casing 44, generally parallel to the end walls 68, 70. The annular wall 92 forms a partition within the motor casing 44 between the motor chamber 48 and the gear train chamber 54, while allowing fluid communication there between (e.g., via various holes, slots, gaps or other openings). As illustrated in the figures, the annular wall 92 may be formed as part of the motor casing 44. However, one skilled in the art should appreciate that the annular wall 92 may be a separate component fixedly secured to the motor casing 44.

An annular space 96 is defined axially between the annular wall 92 and the end wall 70 of the gear train casing 50 along a rotation axis A. A disk 98 is located in the annular space 96 and fixed for rotation on the drive shaft 56 (with a splined shaft or similar configuration) between the end walls 68, 70. The disk 98 includes an annular portion 100 terminating at an outer periphery 102 that is spaced radially inward from the sidewall 94. A face 104 of the disk 98 is spaced along the rotational axis A from the annular wall 92 by a gap clearance G.

The face 104 of the annular portion 100 may include frictional or entraining surface features 106 (e.g., as shown in FIG. 5) for stimulating and improving the fluid transport capabilities of the disk 98. However, the features 106 may not be included or required in various applications. Furthermore, it should be understood that the radial extent of the annular portion 100 might vary for a given application. For example, the annular portion 100 may extend radially inward only as far as the annular wall 92 or alternately to an inner portion of the disk 98. In this regard, the disk 98 may be a clutch disk or brake friction element typically used in the drive arrangement 40.

Referring also to FIGS. 4-6, the disk 98, 98', 98" may be monolithic structure of a uniform material with surface treatment in any of various forms (e.g., etching, scoring, laser cutting, printing, etc.) providing the surface features 106, 106', 106", or it may be a composite structure, for example, having a metal substrate with a paper or composite material laminated thereon to form the annular portion 100. As mentioned, the surface features 106 formed in the face 104 of the disk 98 may stimulate fluid transport to the disk 98 and/or aid in carrying fluid on the disk 98. These features may be in any arrangement or take any form. They may be raised from, or recessed into, the nominal radial surface of the disk 98. For example, the surface features 106 may include a grid of channels or grooves (FIG. 4) in the face 104 to form a waffle pattern. Alternately, the surface features 106.1 may include a series of angular channels arranged in a crossing manner (FIG. 5) to form a sunburst pattern, or the surface features 106.2 may include series of channels arranged in a parallel manner (FIG. 6) to form a spiral pattern. Other surface features for the face 104 may be devised that promote a radially outward spiral, slinging action of fluid entrained on the face 104 as the disk 98 is rotated.

One or more ports 108 formed through the end wall 68 of motor casing 44 and one or more ports 110 formed through the end wall 70 of gear train casing 50 provide fluid communication, such as a fluid passageway 112 (FIG. 3), between the motor chamber 48 and the gear train chamber 54. While ports 108, 110 are shown in the drawings as a single opening through the bottom of end walls 68, 70, one skilled in the art will appreciate that ports 108, 110 may include multiple openings angularly spaced in the end wall 68, 70 to move fluid there through. The fluid passageway 112 includes a first section 112a extending from port 108 radially inward between the end wall 68 and the annular wall 92, a second section 112b extending radially outward between the annular wall 92 and the face 106 of the disk 98, and a third section 112c extending axially between the outer periphery 102 of the disk 98 and the side wall 94 to the port 110.

As noted above, the drive arrangement 40 generally has liquid lubricating and cooling fluid circulating through the gear train assembly 52. During operation, liquid fluid F may migrate from the gear train chamber 54 into the motor chamber 48. Once in the motor chamber 48, the fluid F may be trapped in the gap between the rotating rotor 64 and the fixed stator 66 increasing windage and parasitic drag on the electric motor 46.

The rotating disk 98 addresses this situation by creating a pressure differential in the passageway 112 to draw the fluid F out of the motor chamber 48 and into the gear train chamber 54. In particular, the fluid F in the annular space 96 creates a pressure gradient resulting from increasing angular velocity from the inner edge to the outer edge of the annular portion 100 of the disk 98 (i.e., a negative pressure gradient) to draw the fluid F through the first section 112a of the passageway 112. Once in contact with the annular portion 100 of the disk 98, the fluid F is moved through the second and third passageway 112b, 112c by a centrifugal force generated by the rotating disk 98.

With this understanding of the fluid transport arrangement, it should be appreciated that the configuration and spacing of certain elements in the drive arrangement are important to provide an efficient and effective fluid transport mechanism. For example, the axial dimension of gap clearance G is effective for adjusting the pressure differential created. A gap clearance G that is too large may not create an adequate pressure gradient to draw fluid from the motor casing 44 through the first passageway 112a. Conversely, a gap clearance G that is too small may increase the drag on the fluid F flowing through the first passageway. The length of the second passageway 112b as defined by the height H of the annular wall 92 relative to the locations of ports 108, 110 may also impact the pressure differential. If the annular wall is too short the pressure gradient may be too small. Conversely, if the annular wall is too long, the fluid F will stall in the second passageway 112b. The specific dimensions for the gap clearance and the wall height will be dictated by the specific application including the rotational velocity of the disk 98 and the viscosity of the fluid F. Example gap clearance dimensions may range from 0.1 mm to 0.5 mm for example disk diameter dimensions ranging from 40 mm to 200 mm. The larger the diameter of disk 98, the larger the gap clearance distance should be as well as the larger the annular gap at the outer periphery (i.e., the outer diameter) of the disk 98 to reduce windage losses.

Referring again to FIG. 3, the port 110 may formed anywhere in the end wall 70 within an annular radial band coextensive with the annular wall 92. However, locating the port 110 through the end wall 70 at a radially outermost location in the gear train casing 50 may have the advantage of requiring less energy to overcome gravity. For example, locating the port 110 radially inward along the end wall 70 may unnecessarily create a pressure head due to a height difference between the third passageway 112c and the port 110 leading to less efficient fluid transport.

In some instances, it may be beneficial to form holes through the rotating disk 98 for transporting lubricating fluid to the back 114 thereof. Lubricating fluid F flowing on both sides 104, 114 of the annular portion 100 may increase the pressure gradient and/or decrease the fluid drag in the second passageway 112b. In this case, the back of the annular portion 100 may include frictional or entraining surface features, similar to those shown in FIGS. 4-6 for the face 104, for stimulating and effecting fluid transport.

Having explained the fundamental concepts of the disclosure in terms of an example embodiment for the drive arrangement 40, certain additions and/or modifications to these concepts will be understood. One skilled in the art will appreciate that the number, configuration and arrangement of the ports, walls and rotating disk, as well as the design of any surface features can be varied according to the particular application and packaging associated with the drive arrangement. For example, a second, opposite face of the rotating disk may be provided with second annular portion having entraining surface features to carry fluid in the manner described above. Also, one or more additional rotating disks, and corresponding annular walls as needed, may be provided to entrain and move fluid, thereby increasing the fluid carrying capacity of the system. Such combinations and/or modifications are fully contemplated by the spirit and scope of the disclosure provided herein.

Moreover, the terminology used herein is for the purpose of describing particular embodiments only and is not intended to be limiting of the disclosure. Thus, it will be appreciated that the term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared centerline, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Similarly, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A drive arrangement, comprising:
   a housing having first and second chambers;
   a shaft mounted within the housing for rotation about a rotation axis extending between the first and second chambers;
   a partition within the housing between the first and second chambers allowing fluid communication between the first and second chambers; and
   a disk mounted to the shaft for co-rotation about the rotation axis, the disk having an outer periphery and an annular portion with a face having entraining surface features, the face of the disk being spaced along the rotation axis from the partition by a gap clearance;
   wherein the gap clearance has an axial dimension selected such that rotation of the disk creates a negative pressure gradient drawing fluid from a direction of the first chamber through the gap clearance in a radial direction toward the rotation axis to an inner diameter of the annular portion of the disk, rotation of the disk thereafter moving the fluid, under centrifugal action, along the face of the disk in a radial direction away from the rotation axis; and
   wherein the outer periphery of the disk is spaced from the housing to permit fluid to pass, by centrifugal action, from the outer periphery of the disk toward the second chamber.

2. The drive arrangement of claim 1, wherein a first passage extending from a first chamber side of the partition to a second chamber side of the partition at a first side of the disk is located radially inward with respect to the rotation axis of a second passage to the second chamber at a second side of the disk.

3. The drive arrangement of claim 1, wherein the partition includes an annular wall having an inner diameter positioned axially with respect to the rotation axis between the first and second chambers and fixed with respect to the housing; and
   wherein the inner diameter of the annular wall is radially inward of a passage to the second chamber.

4. The drive arrangement of claim of 3, wherein the housing includes an end wall enclosing the first chamber, and
   wherein the annular wall is spaced axially with respect to the rotation axis between the end wall and the disk.

5. The drive arrangement of claim 1, wherein the disk includes a second face with a second annular portion having entraining surface features.

6. The drive arrangement of claim 1, further comprising:
a motor assembly having disposed within the first chamber, the motor having a rotor coupled for co-rotation to the shaft and a stator spaced radially with respect to the rotation axis from the rotor by an annular gap;
a gear train assembly disposed within the second chamber and driven by the shaft; and
wherein the negative pressure gradient arising from rotation of the disk draws fluid from the annular gap.

7. The drive arrangement of claim 1, wherein the entraining surface features include a plurality of channels formed in at least an annular portion on the face of the disk.

8. The drive arrangement of claim 1, wherein the entraining surface features form a pattern across the face of the including one of a waffle pattern, a spiral pattern, and a sunburst pattern.

9. A drive arrangement, comprising:
a housing having first and second chambers;
a shaft mounted within the housing for rotation about a rotation axis extending between the first and second chambers;
an annular wall fixed within the housing positioned axially with respect to the rotation axis between the first and second chambers allowing fluid communication between the first and second chambers, the annular wall having an inner diameter between the first and second chambers radially inward of a passage to the second chamber;
a disk mounted to the shaft for co-rotation about the rotation axis, the disk having an outer periphery and an annular portion with a face having entraining surface features, the face of the disk being spaced along the rotation axis from the annular wall by a gap clearance;
wherein the gap clearance has an axial dimension selected such that rotation of the disk creates a negative pressure gradient drawing fluid from a direction of the first chamber through the gap clearance in a radial direction toward the rotation axis to an inner diameter of the annular portion of the disk, rotation of the disk thereafter moving the fluid, under centrifugal action, along the face of the disk in a radial direction away from the rotation axis; and
wherein the outer periphery of the disk is spaced from the housing to permit fluid to pass, by centrifugal action, from the outer periphery of the disk toward the second chamber.

10. The drive arrangement of claim of 9, wherein the housing includes and end wall enclosing the first chamber, and wherein the annular wall is spaced axially with respect to the rotation axis between the end wall and the disk.

11. The drive arrangement of claim 9, further comprising:
a motor assembly having disposed within the first chamber, the motor having a rotor coupled for co-rotation to the shaft and a stator spaced radially with respect to the rotation axis from the rotor by an annular gap;
a gear train assembly disposed within the second chamber and driven by the shaft; and
wherein the negative pressure gradient arising from rotation of the disk draws fluid from the annular gap.

12. The drive arrangement of claim 9, wherein the entraining surface features include a plurality of channels formed in at least an annular portion on the face of the disk.

13. The drive arrangement of claim 9, wherein the entraining surface features form a pattern across the face of the including one of a waffle pattern, a spiral pattern, and a sunburst pattern.

14. The drive arrangement of claim 9, wherein the disk includes a second face with a second annular portion having entraining surface features.

15. A drive arrangement, comprising:
a housing having a motor contained in a motor chamber and a gear train contained in a gear train chamber, the motor having a shaft rotatable about a rotation axis;
a partition within the housing between the motor chamber and the gear train chamber allowing fluid communication therebetween; and
a disk mounted to the shaft for co-rotation about the rotation axis, the disk having an outer periphery and an annular portion having a face with entraining surface features, the face of the disk being spaced along the rotation axis from the partition by a gap clearance;
wherein the gap clearance has an axial dimension selected such that rotation of the disk creates a negative pressure gradient drawing fluid from a direction of the motor chamber through the gap clearance in a radial direction toward the rotation axis to an inner diameter of the annular portion of the disk, rotation of the disk thereafter moving the fluid, under centrifugal action, along the face of the disk in a radial direction away from the rotation axis; and
wherein the outer periphery of the disk is spaced from the housing to permit fluid to pass, by centrifugal action, from the outer periphery of the disk toward the gear train chamber.

16. The drive arrangement of claim 15, wherein the partition includes:
an annular wall having an inner diameter positioned axially with respect to the rotation axis between the motor chamber and the gear train chambers and fixed with respect to the housing, the inner diameter of the annular wall being radially inward with respect to the rotation axis of a gear chamber passage; and
wherein the motor chamber includes an end wall and the annular wall is spaced axially with respect to the rotation axis between the end wall and the disk.

17. The drive arrangement of claim 15, the annular portion of the disk further includes a second face with entraining surface features.

18. The drive arrangement of claim 15, wherein the entraining surface features form a pattern across the face of the including one of a waffle pattern, a spiral pattern, and a sunburst pattern.

19. The drive arrangement of claim 15, wherein the entraining surface features include a plurality of channels formed in at least an annular portion on the face of the disk.

20. The drive arrangement of claim 15, further comprising:
a motor assembly having disposed within the first chamber, the motor having a rotor coupled for co-rotation to the shaft and a stator spaced radially with respect to the rotation axis from the rotor by an annular gap;
a gear train assembly disposed within the second chamber and driven by the shaft; and
wherein the negative pressure gradient arising from rotation of the disk draws fluid from the annular gap.

* * * * *